US008417710B2

(12) United States Patent
Drissi et al.

(10) Patent No.: US 8,417,710 B2
(45) Date of Patent: Apr. 9, 2013

(54) PUBLIC RELATIONS AND REPUTATION MINING VIA SEMANTIC ANALYTICS

(75) Inventors: Youssef Drissi, Ossining, NY (US); Tyrone W. Grandison, San Jose, CA (US); Colin G. Harrison, Brookfield, CT (US); Kaan K. Katircioglu, Yorktown Heights, NY (US); Jurij R. Paraszczak, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 12/886,077

(22) Filed: Sep. 20, 2010

(65) Prior Publication Data
US 2012/0072429 A1 Mar. 22, 2012

(51) Int. Cl.
*G06F 7/00* (2006.01)
*G06F 17/30* (2006.01)
(52) U.S. Cl.
USPC .......................................... 707/748; 707/752
(58) Field of Classification Search .................. 707/713, 707/722, 736, 738, 748, 752
See application file for complete search history.

(56) References Cited

U.S. PATENT DOCUMENTS

| 7,139,752 | B2 | 11/2006 | Broder et al. | |
|---|---|---|---|---|
| 7,146,361 | B2 | 12/2006 | Broder et al. | |
| 7,606,781 | B2 | 10/2009 | Sweeny et al. | |
| 7,739,218 | B2* | 6/2010 | Arguello et al. | 706/61 |
| 7,769,751 | B1* | 8/2010 | Wu et al. | 707/728 |
| 8,150,843 | B2* | 4/2012 | Chitiveli et al. | 707/723 |
| 2003/0220913 | A1* | 11/2003 | Doganata et al. | 707/3 |
| 2007/0043742 | A1* | 2/2007 | Arguello et al. | 707/100 |
| 2007/0179942 | A1* | 8/2007 | Heggem | 707/5 |
| 2007/0192314 | A1* | 8/2007 | Heggem | 707/5 |
| 2008/0270393 | A1* | 10/2008 | Doganata et al. | 707/5 |
| 2009/0222441 | A1 | 9/2009 | Broder et al. | |
| 2011/0004609 | A1* | 1/2011 | Chitiveli et al. | 707/759 |

OTHER PUBLICATIONS

Han, et al., "An Efficient Clustering Approach for Large Document Collections," ADMA/LNAI 3584, 2005, pp. 240-247.
Bell, et al., "Modeling Relationships at Multiple Scales to Improve Accuracy of Large Recommender Systems," KDD, Aug. 12-15, 2007, San Jose California.
Marius Pasca, "Lightweight Web-Based Fact Repositories for Textual Question Answering," CIKM, Nov. 6-8, 2007, Lisboa Portugal.
"A System for Predictive Monitoring of Business Processes Using Unstructured Activities," IPCOM000186033D, Aug. 6 2009.

* cited by examiner

*Primary Examiner* — Phong Nguyen
(74) *Attorney, Agent, or Firm* — Jose Gutman; Fleit Gibbons Gutman Bongini & Bianco PL

(57) ABSTRACT

A method, information processing system, and computer readable storage medium manage public relations queries using semantic analysis. A public relations query expressed in natural language is received from a user. A set of relevant topics and subjects associated with the query are identified. A set of information sources are identified that comprise data associated with the set of topics and subjects based on the set of topics and subjects. A set of data from the set of information sources is identified that satisfies the query. A set of weights are assigned to the set of data that has been identified. A set of data elements within the set of data that comprises a set of weights above a given threshold are identified. A response to the query is generated using the set of data elements that has been identified.

14 Claims, 4 Drawing Sheets

PUBLIC RELATIONS AND REPUTATION MINING VIA SEMANTIC ANALYTICS

FIELD OF THE INVENTION

The present invention generally relates to data mining, and more particularly relates to public relations and reputation data mining.

BACKGROUND OF THE INVENTION

In today's world, Public Relations (PR) is as important as the core business function of a company. Marketing and image management are essential tools in a business' arsenal of tools that help keep it alive and solvent. All are critical for brand management and for fostering trust, which are the two of the pillars upon which a successful enterprise is built. In a fast-paced environment, where many multiple markets are connected and information disseminates in Internet timescales, public relations management takes on an increased significance. Unfortunately, traditional mechanisms for enabling public relations management have been slow to recognize a game-changing trend in the landscape of their field, i.e., an ever increasing proportion of public feedback is moving online.

SUMMARY OF THE INVENTION

In one embodiment, a method for managing public relations queries using semantic analysis is disclosed. The method comprises receiving a public relations query from a user. A set of relevant topics and subjects associated with the query are identified. A set of information sources are identified that comprise data associated with the set of topics and subjects based on the set of topics and subjects. A set of data from the set of information sources is identified that satisfies the query. A set of weights are assigned to the set of data that has been identified. A set of data elements within the set of data that comprises a set of weights above a given threshold are identified. A response to the query is generated using the set of data elements that has been identified.

In another embodiment, an information processing system for managing queries using semantic analysis is disclosed. The information processing system comprises a memory and a processor communicatively coupled to the memory. A data mining system communicatively coupled to the memory and the processor is adapted to receive a public relations query from a user. A set of relevant topics and subjects associated with the query are identified. A set of information sources are identified that comprise data associated with the set of topics and subjects based on the set of topics and subjects. A set of data from the set of information sources is identified that satisfies the query. A set of weights are assigned to the set of data that has been identified. A set of data elements within the set of data that comprises a set of weights above a given threshold are identified. A response to the query is generated using the set of data elements that has been identified.

In yet another embodiment, a computer program product manages queries using semantic analysis is disclosed. The computer program product comprises a storage medium readable by a processing circuit and storing instructions for execution by the processing circuit for performing a method. The method comprises receiving a public relations query expressed in natural language from a user. A set of relevant topics and subjects associated with the query are identified. A set of information sources are identified that comprise data associated with the set of topics and subjects based on the set of topics and subjects. A set of data from the set of information sources is identified that satisfies the query. A set of weights are assigned to the set of data that has been identified. A set of data elements within the set of data that comprises a set of weights above a given threshold are identified. A response to the query is generated using the set of data elements that has been identified.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Operating Environment

Figure 1:
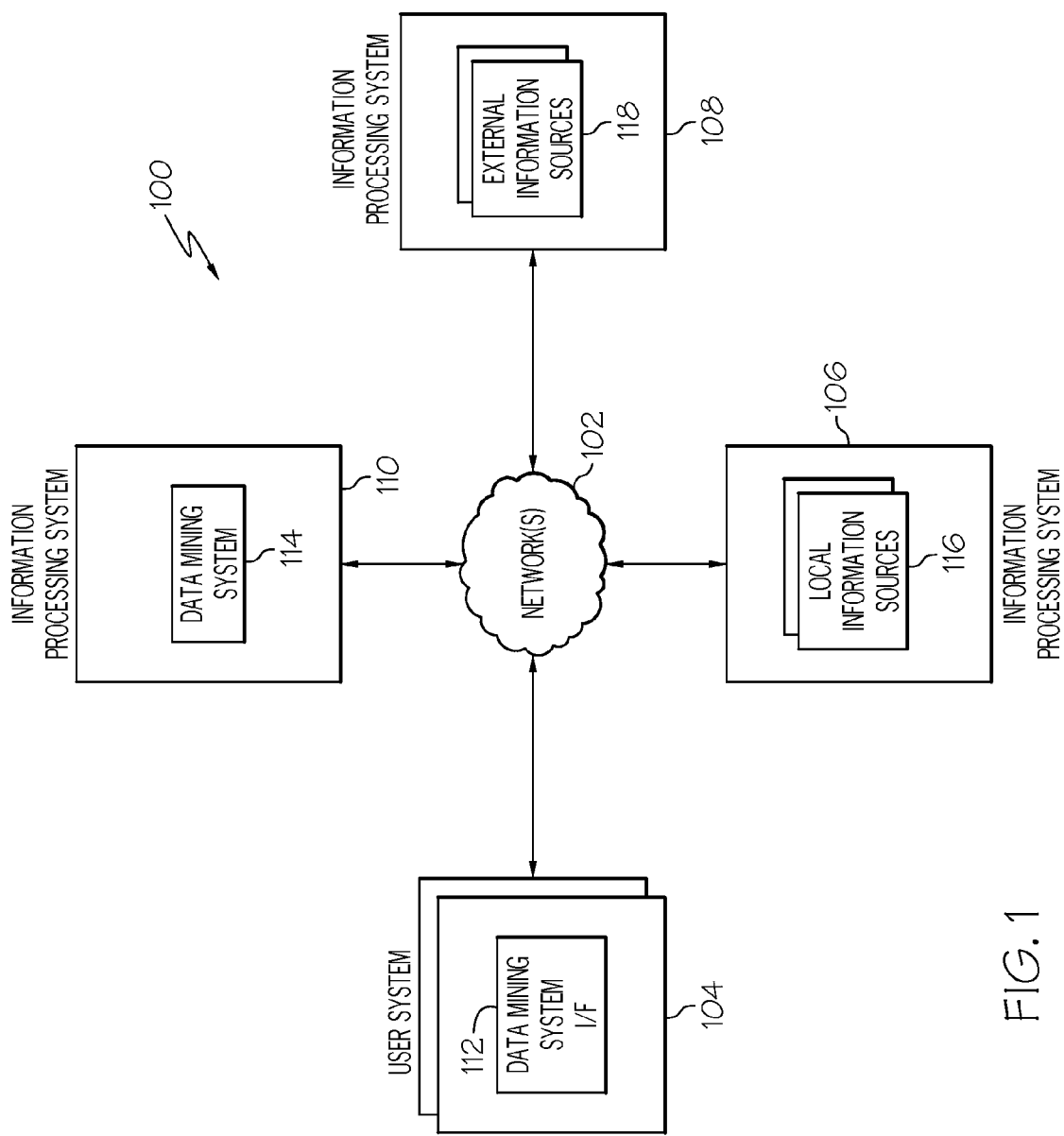
FIG. 1 is a block diagram illustrating one example of an operating environment according to one embodiment of the present invention.

According to one embodiment, FIG. 1 illustrates one example of an operating environment/system 100 that semantically analyzes both online and proprietary data to generate insight that facilitates public relations mining and reputation monitoring. FIG. 1 shows one or more networks 102 that, in one embodiment, are wide area networks, local area networks, wired networks, wireless networks, and/or the like. In one embodiment, the one or more networks 102 comprise both a public network such as the Internet and a local network such as an intranet.

FIG. 1 also shows a plurality of information processing systems being communicatively coupled to the one or more networks 102. In particular, FIG. 1 one or more user information processing systems 104, one or more information source systems 106, 108, and one or more server systems 110. The user information processing system 104 comprises a data mining system interface 112 that allows a user of the system 104 to interact with a data mining system 114 residing at the one or more server systems 110. The data mining system interface 112, in one embodiment, is a web browser or any other application that communicates with the data mining system 114 and displays information to the user from the data mining system 114.

The information processing system(s) 106, in one embodiment, comprises information sources 116 that are local (or proprietary) to an entity such as a business/company that operates or is using the data mining system 114. These local information sources 118 are generally obtained locally from systems that are only accessible by the entity or an agent of the entity. Examples of local information sources 116 are confidential reports, market research, and the like. The information processing system 108 comprises information sources 118 that are external to the entity. These external information sources 118 are generally obtained through publicly accessible systems through a public network such as the Internet. An example of an external information source 118 is a web page. It should be noted that the local information sources 116 and the external information sources 118 can each comprise different modalities.

A user, in one embodiment, submits a questions/query to the data mining system 114 via the interface 112. Examples of a question/query that can be submitted are "How did our partners in Europe react to our announcement/decision to purchase all our wind mills from China for the next 5 years?"; "What was the reaction on the same day of the announcement? after a week? after 6 months? between March and July 2008?"; "What amount of business losses should we expect to have with our European customers if we go ahead and implement this decision?"; and "Given the overall reaction to the announcement, is it wise to "stay the coarse" regarding that decision?". The data mining system 114 performs a semantic analysis on the question/query submitted by the user and the information collected from the local/external information sources 116, 118 and using weights assigned to the local/external information sources 116, 118 provides a response to the user's question/query. It should be noted that the term "semantic analysis", as used throughout this discussion, refers to relating syntactic structures from the levels of words, phrases, clauses, sentences, and/or paragraphs to their language-independent meanings. This process may use "entity and relation detectors" that finds instances of a certain concept in text. For example, a sentiment detector identifies textual instances of the "sentiment" concept, such as "happy with", "sad", "like", "hate", "impressed", etc. This process performed be the data mining system 114 is advantageous because it provides a response based not only on local data, but also external data such as information obtained from the Internet. This facilitates public relations mining and reputation monitoring. The data mining system 114 is discussed in greater detail below.

Data Mining System

Figure 2:
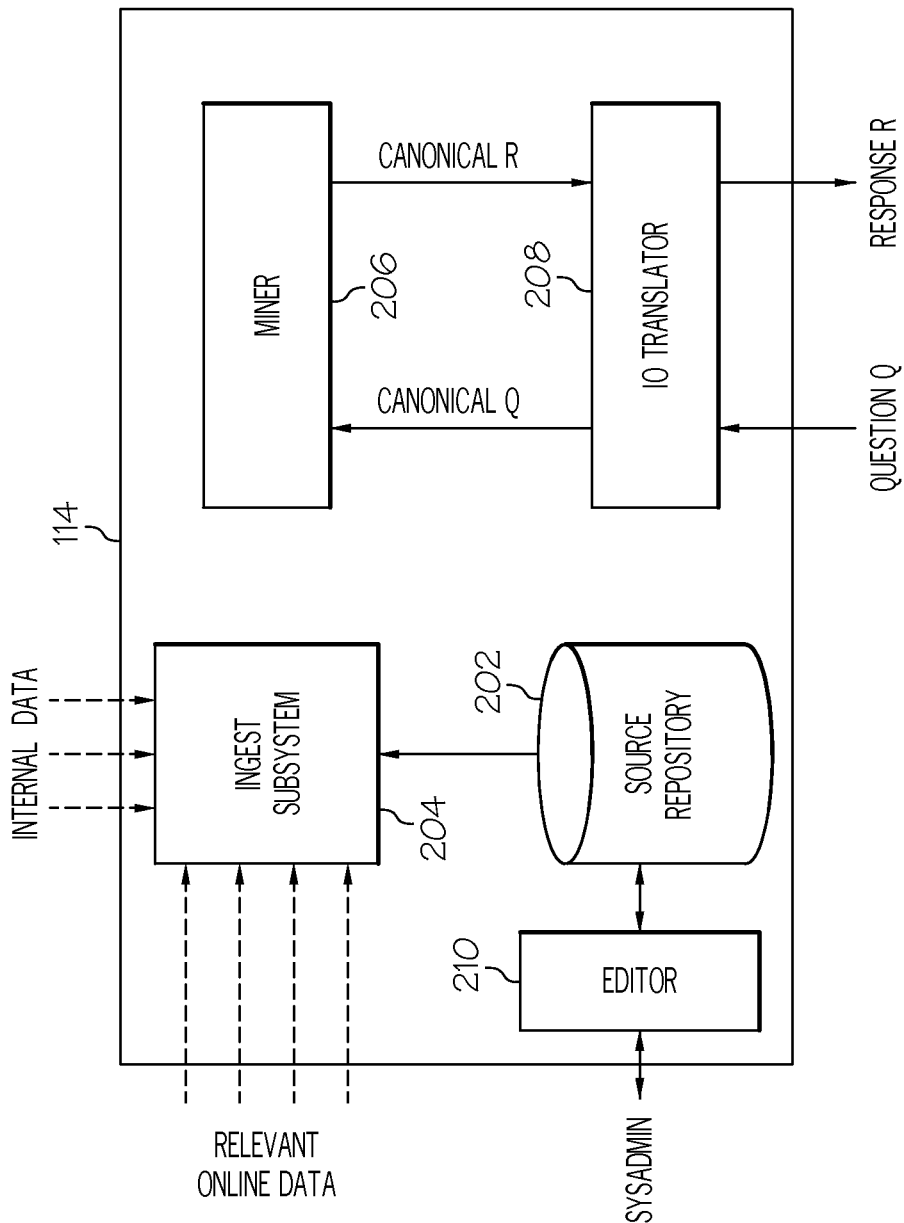
FIG. 2 is a block diagram showing a detailed view of a data mining system according to one embodiment of the present invention.

FIG. 2 is a block diagram illustrating a more detailed view of the data mining system 114. The data mining system 114, in one embodiment, comprises a source repository 202, an ingest subsystem 204, a miner 206, an I/O translator 208, and an editor 210. The source repository 202 comprises data associated with the local and external information sources 116, 118, as is discussed in greater detail below.

In one embodiment, the source repository 202 is automatically populated by a web crawler that periodically scans the external information sources through, for example, the Internet and also periodically scans local/internal information sources through, for example, an intranet. The web crawler determines the relevant topic for each root information source, such as a root web page or a root page of a report, that has been visited and stores this in the repository (without administrator intervention). Therefore, the source repository 202 comprises a set of source name and related topic pairs. For example, (http://profile.myspace.com/index.cfm?fuseaction=music, MUSIC) where "http://profile.myspace.com/index.cfm?fuseaction=music" is the source name and "MUSIC" is the related topic; (www.youtube.com, VIDEO) where "www.youtube.com" is the source name and "VIDEO" is the related topic; etc. It should be noted that a source can be associated with multiple topics.

The editor 210 is the tool used by a system administrator to manage the set of topics, the set of sources, and the set of associations between the two. For example, the system administrator interactions with the data mining system 114 via the editor 210 to edit the information sources 116, 118 within the source repository 202. This allows the system administrator to manage the information sources 116, 118 within the source repository 202 to ensure that only relevant information sources 116, 118 are being maintained within the repository 202. For example, an administrator from the public relations or marketing department of the entity operating/managing/using the data mining system 114 can edit the information sources 116, 118 within the repository 202 to only include given information sub fields or domains that are relevant to the entity. Therefore, the information sources 116, 118 within the repository 202 is relevant to the entity. Alternatively, an automatic agent or the web crawler can be configured to only populate the repository 202 with information that is relevant to the entity or to edit the repository after it has been populated.

As discussed above, a user submits a question/query to the data mining system 114. For example, the user asks a question, Q, of the form: "How did our partners in Europe react to our announcement/decision to purchase all our wind mills from China for the next 5 years?"; "What was the reaction on the same day of the announcement? after a week? after 6 months? between March and July 2008?"; "What amount of business losses should we expect to have with our European customers if we go ahead and implement this decision?"; "Given the overall reaction to the announcement, is it wise to "stay the coarse" regarding that decision?"; and the like.

The I/O translator 208 receives the question, Q, and converts it to a canonical form with the following format:
<question-type, subject, conditions>
For example, "How did our partners in Europe react to our announcement/decision to purchase all our wind mills from China for the next 5 years?" is converted into the form <reaction, partners in Europe, when action="purchase" object="wind mills" source="China" duration="next 5 years">. The question "What amount of business losses should we expect to have with our European customers if we go ahead and implement this decision?" is converted to <quantity, European customers, quantity="losses" action="implement this decision">.

The miner 206 receives the question in canonical form from the I/O translator 208 and performs various operations to provide a response to the user. For example, the miner 206 transforms the elements in the canonical form into their most basic form. The miner 206 does this, in one embodiment, by leveraging a series of company-specific dictionaries to decompose abstract terms such as "partners in Europe" and "implement this decision" to "Charles Schwab, HSBC" and "buy Water & Utilities Co". In other words, the company-specific dictionaries map abstract terms/phrases to more specific terms/phrases that are relevant to the company. In this embodiment, heuristics for date and time transformations are also assumed. For example, the phrase "next 5 years" is transformed into "2009 to 2014". In a more sophisticated embodiment, the miner 206 is imbued with domain and application-specific heuristic algorithms that allow the automatic translation of the elements to actionable base forms.

Once the miner 206 transforms the elements in the canonical form into their most basic form the miner 206 sends the relevant topics and subjects to the ingest subsystem 204. The data ingest subsystem 204 looks up the relevant data source locations, gathers the data, performs initial sanitization and integration and passes it on to the miner 206. For example, as discussed above, the source repository 202 comprises a seed/initial list of topics and relevant information sources such as web pages, reports, and the like. The ingest subsystem 204 compares the topic of interest received from the miner 206 to the data 116, 118 within the repository 202 to identify the matching information within the repository. For example, if a topic received from the miner 206 is "Video" the ingest subsystem 204 identifies the "www.youtube.com, VIDEO" topic/source pair.

Once the ingest subsystem 204 has identified a set of relevant source/topic pairs the ingest subsystem 204 then goes to the relevant information sources 116, 118 such as web pages, internal reports, and the like and extracts the data comprised therein. This data extraction can be performed in a number of ways including, but not limited to performing a doing a search at the information source, performing screen scraping, accessing a predefined API for access to data on that source, specialized web crawlers, and the like. This targets information sources and the corresponding content to focus the corpus of documents to analyze the result hits (instead of crawling the whole web). If a keyword search is performed to extract the data the keywords can be entered by the user with the question/query or automatically extracted from the user's question itself.

The ingest subsystem 204 then sanitizes the extracted data, which can includes operations such as, but not limited to, formatting the data, removing unwanted metadata such html tags, categorizing and organizing the data before processing it by the miner, and the like. This sanitized data is then passed to the miner 206. The miner 206 then analyzes the sanitized data to determine if this data comprises an answer to the user's question/query. The process of determining if the data received from the ingest subsystem 204 comprises an answer can include running association rule mining or other techniques on the data set. In one embodiment, this mining can comprise leveraging contemporary algorithms for advanced text analytics.

The result of the above analysis operation is a set of data that is relevant to the user's questions/query. For example, if the user asks about "our company's image" in the community of European router suppliers then the result of the analyze can comprise a list of those suppliers with different public statements from their executives about the company. The number of analysis results (e.g. search results, information hits extracted from the web, etc) can be massive and overwhelming. Therefore, the miner 206 assigns weights to the analysis results and subsequently orders these weighted results by importance/relevance. This allows the most important and/or relevant results to be easily identified and selected to provide an answer to the user's question query.

In one embodiment, the miner uses a monotonically increasing function $f(x_1, \ldots, x_n)$, to calculate the resultant weight of the analysis results. The weights, in one embodiment, are proportional to one or more of the following. 1) The number of web pages linking to the page from which the data used to generate the analysis result was extracted from. This number indicates the importance of that page (information source). The miner 206, in this embodiment, can limit the counting to only the portion of those web pages that belong to a certain industry, geographical area, company, etc. If the user is interested in the opinions of certain information sources this technique could be used to "target" those sources. 2.) Search engine page rank. In this embodiment, the miner takes into account the ranking of the web page from which the data used to generate the analysis result was extracted from.

For example, in an embodiment where the ingest system 204 performs a keyword search to target information sources, as discussed above, the ingest system can utilize a search engine to perform the search. The ingest system 204 records the ranking of the pages resulting from this search and sends this ranking information along with the associated sanitized data to the miner. The miner 206 can then utilize this ranking information to assign a weight to the analysis results where an resulting analysis data set obtained from a higher ranked web page is assigned a higher weight than an analysis data set obtained from a lower ranked web page. 3.) The importance the user (e.g. PR executives or analysts) gives to the information source. For example, a user can assign a given weight to one or more of the information sources used to produce the analysis results. 4.) A combination of the above.

Once the miner 206 assigns the weights to the analysis results the miner 206 orders these weighted results by importance/relevance. The miner 206 is then able to identify the most relevant results that can provide an answer to the user's question/query. Using these weighted and sorted results the miner 206 then provides an answer to the user's question. This answer is displayed to the user via the data mining system interface 112.

Operational Flow Diagram

Figure 3:
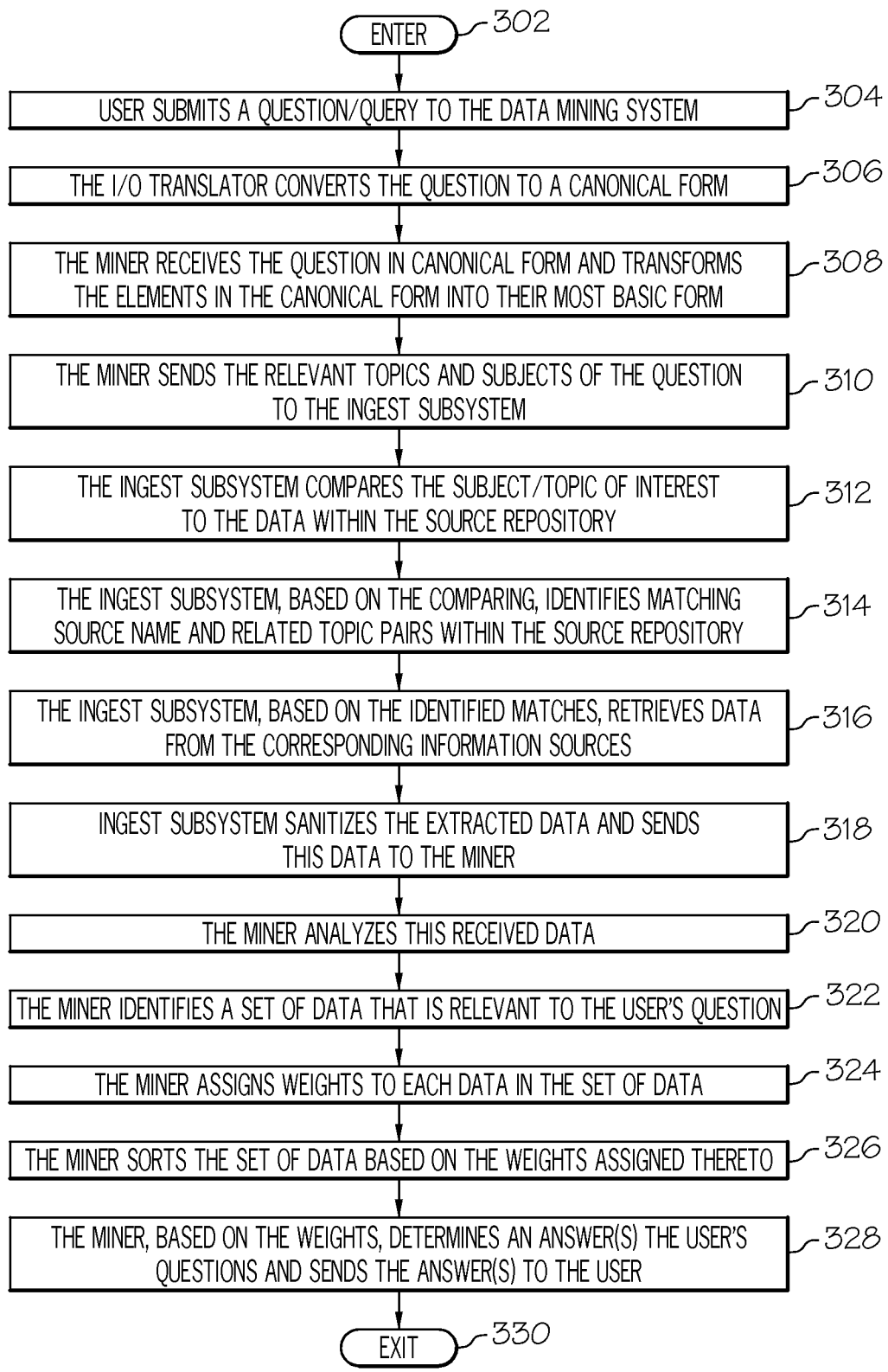
FIG. 3 is an operational flow diagram illustrating a process for using local and external data for data mining according to one embodiment of the present invention.

FIG. 3 is an operational flow diagram illustrating one process for utilizing local and external data for public relations and reputation data mining. The control flow of FIG. 3 begins at step 302 and flows directly into step 304. A user, at step 304, submits a question/query to the data mining system 114. The I/O translator 208, at step 306, converts the question to a canonical form. The miner 206, at step 308, receives the question in canonical form and transforms the elements of the question into their most basic form, as discussed above.

The miner 206, at step 310, sends the relevant topics and subjects of the question to the ingest subsystem 204. The ingest subsystem 204, at step 312, compares the subject/topic of interest to the source name and related topic pairs within the source repository 202. The ingest subsystem 204, at step 314, based on the comparing, identifies source name and related topic pairs within the source repository that match the subject/topic of interest. The ingest subsystem 204, at step 316, based on the identified matches, retrieves/extracts data from the information sources that correspond to the source name and related topic pairs that have been identified.

The ingest subsystem 204, at step 318, sanitizes the extracted data and this sanitized data to the miner 206. The miner 206, at step 320, analyzes this received data. The miner 206, at step 322, identifies a set of data that is relevant to the user's question. The miner 206, at step 324, assigns weights to each data element in the set of data. This process of assigning weights has been discussed in greater detail above. The miner 206, at step 326, sorts the set of data based on the weights that have been assigned thereto. The miner 206, at step 328, determines an answer(s) to the user's questions based on the sorted data set and sends the answer(s) to the user. The control flow then exits at step 330.

Information Processing System

Figure 4:
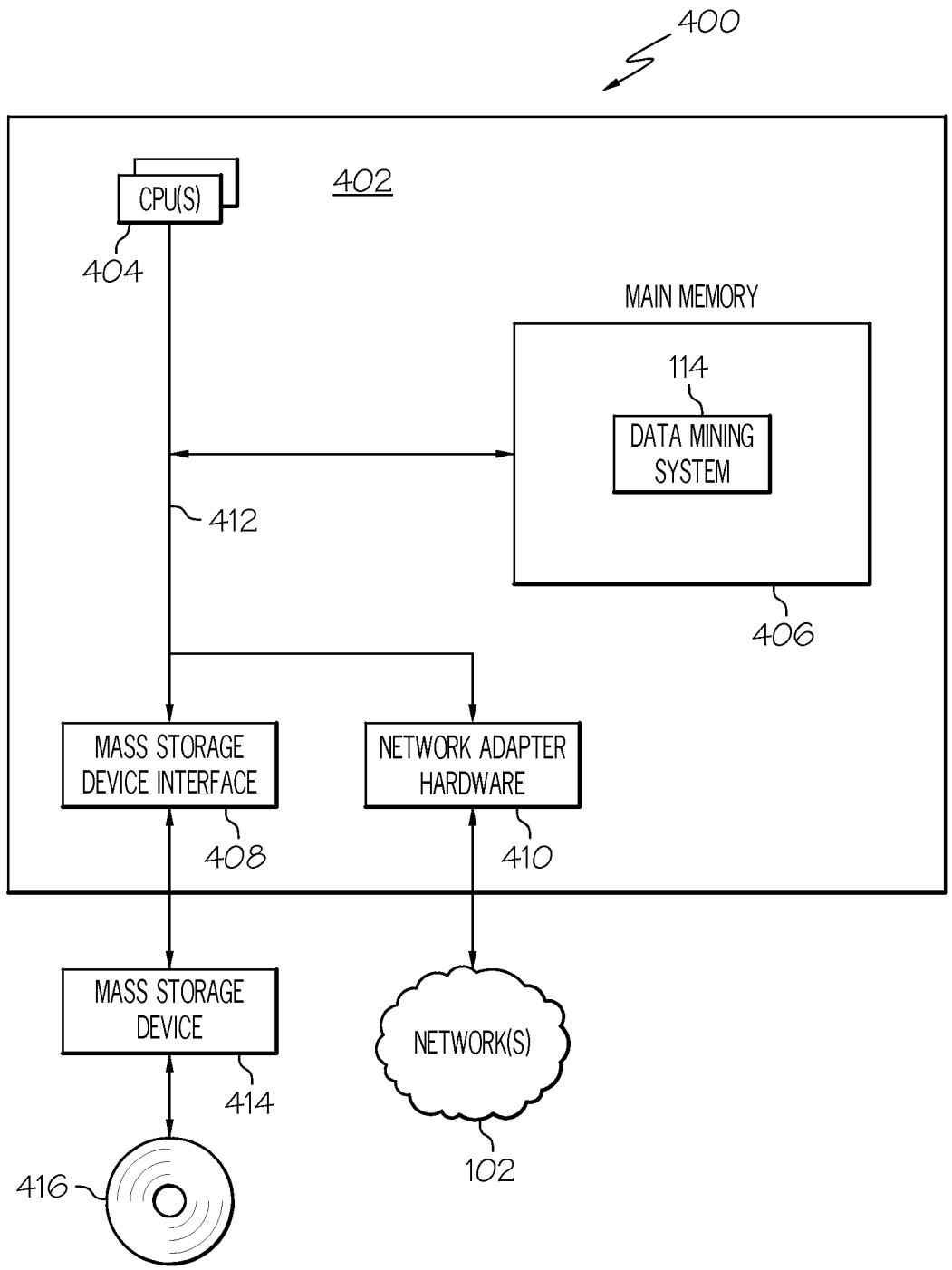
FIG. 4 is a block diagram illustrating detailed view of an information processing system according to one embodiment of the present invention.

FIG. 4 is a block diagram illustrating a more detailed view of an information processing system 4 that can be utilized in the operating environment 100 discussed above with respect to FIG. 1. The information processing system 4 is based upon a suitably configured processing system adapted to implement one or more embodiments of the present invention. Similarly, any suitably configured processing system can be used as the information processing system 4 by embodiments of the present invention.

The information processing system 400 includes a computer 402. The computer 402 has a processor(s) 404 that is connected to a main memory 406, mass storage interface 408, and network adapter hardware 410. A system bus 412 interconnects these system components. The main memory 406, in one embodiment, the data mining system 114 discussed above.

Although illustrated as concurrently resident in the main memory 406, it is clear that respective components of the main memory 406 are not required to be completely resident in the main memory 406 at all times or even at the same time. In one embodiment, the information processing system 400 utilizes conventional virtual addressing mechanisms to allow programs to behave as if they have access to a large, single storage entity, referred to herein as a computer system memory, instead of access to multiple, smaller storage entities such as the main memory 406 and data storage device 416. Note that the term "computer system memory" is used herein to generically refer to the entire virtual memory of the information processing system.

The mass storage interface 408 is used to connect mass storage devices, such as mass storage device 414, to the information processing system 400. One specific type of data storage device is an optical drive such as a CD/DVD drive, which may be used to store data to and read data from a computer readable medium or storage product such as (but not limited to) a CD/DVD 416. Another type of data storage device is a data storage device configured to support, for example, NTFS type file system operations.

Although only one CPU 404 is illustrated for computer 402, computer systems with multiple CPUs can be used equally effectively. Embodiments of the present invention further incorporate interfaces that each includes separate, fully programmed microprocessors that are used to off-load processing from the CPU 404. An operating system (not shown) included in the main memory is a suitable multitasking operating system such as the Linux, UNIX, Windows XP, and Windows Server operating systems. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 400. The network adapter hardware 410 is used to provide an interface to a network 102. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 416, CD ROM, or other form of recordable media, or via any type of electronic transmission mechanism.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method for managing queries using semantic analysis, the method comprising:
   receiving, with a processor, a public relations query from a user, wherein the public relations query comprises query of expressed sentiments about at least one person, entity, or action taken thereby;
   identifying, with a processor, a set of relevant topics and subjects associated with the query;
   identifying, based on the set of topics and subjects, a set of information sources that are identified as relevant information sources for the user and that comprise data associated with the set of topics and subjects;
   identifying a set of data from the set of information sources that satisfies the query;
   determining, with a processor, for each data element in the set of data, a number of web pages that
      a) point to a web page comprising the each data element, and
      b) are in the set of information sources that are identified as relevant information sources for the user;
   assigning a weight to the each data element based on the determined number of web pages, where a higher number of web pages results in a higher weight being assigned than a lower number of web pages;
   identifying a set of data elements within the set of data that comprises a set of weights above a given threshold; and
   generating a response to the query using the set of data elements that has been identified.

2. The method of claim 1, wherein the query is a public relations query expressed in natural language from the user.

3. The method of claim 1, wherein identifying the set of relevant topics and subjects further comprises:
   converting the query into a canonical form.

4. The method of claim 1, wherein the set of information sources comprises a set of proprietary information sources and a set of public information sources.

5. The method of claim 1, wherein the assigning comprises:
   assigning, for each data element in the set of data, a weight to the each data element based on a search engine page rank of a web page comprising the data element.

6. The method of claim 1, wherein the set of weights are assigned manually by a user.

7. An information processing system for managing public relations queries using semantic analysis, the information processing system comprising:
   a memory;
   a processor communicatively coupled to the memory; and
   a data mining system communicatively coupled to the memory and the processor, wherein the data mining system is adapted to:
      receive a public relations query from a user, wherein the public relations query comprises query of expressed sentiments about at least one person, entity, or action taken thereby;
      identify a set of relevant topics and subjects associated with the query;
      identify, based on the set of topics and subjects, a set of information sources that are identified as relevant information sources for the user and that comprise data associated with the set of topics and subjects;
      identify a set of data from the set of information sources that satisfies the query;
      determine, for each data element in the set of data, a number of web pages that
         a) point to a web page comprising the each data element, and
         b) are in the set of information sources that are identified as relevant information sources for the user;
      assign a weight to the each data element based on the determined number of web pages, where a higher number of web pages results in a higher weight being assigned than a lower number of web pages;
      identify a set of data elements within the set of data that comprises a set of weights above a given threshold; and
      generate a response to the query using the set of data elements that has been identified.

8. The information processing system of claim 7, wherein the set of information sources comprises a set of proprietary information sources and a set of public information sources.

9. The information processing system of claim 7, wherein the data mining system is adapted to assign a weight to the each data element by:
   assigning, for each data element in the set of data, a weight to the each data element based on a search engine page rank of a web page comprising the data element.

10. A computer program product for managing public relations queries using semantic analysis, the computer program product comprising:
   a storage medium readable by a processing circuit and storing instructions for execution by the processing circuit for performing a method comprising
   receiving a public relations query from a user, wherein the public relations query comprises query of expressed sentiments about at least one person, entity, or action taken thereby;
   identifying a set of relevant topics and subjects associated with the query;
   identifying, based on the set of topics and subjects, a set of information sources that are identified as relevant information sources for the user and that comprise data associated with the set of topics and subjects;
   identifying a set of data from the set of information sources that satisfies the query;
   determining, for each data element in the set of data, a number of web pages that
      a) point to a web page comprising the each data element, and
      b) are in the set of information sources that are identified as relevant information sources for the user;
   assigning a weight to the each data element based on the determined number of web pages, where a higher number of web pages results in a higher weight being assigned than a lower number of web pages;
   identifying a set of data elements within the set of data that comprises a set of weights above a given threshold; and
   generating a response to the query using the set of data elements that has been identified.

11. The computer program product of claim 10, wherein the query is a public relations query expressed in natural language from the user, and further wherein identifying the set of relevant topics and subjects further comprises converting the query into a canonical form.

12. The computer program product of claim 10, wherein the set of information sources comprises a set of proprietary information sources and a set of public information sources.

13. The computer program product of claim 10, wherein the assigning comprises:
   assigning, for each data element in the set of data, a weight to the each data element based on a search engine page rank of a web page comprising the data element.

14. The computer program product of claim 10, wherein the set of weights are assigned manually by a user.

* * * * *